United States Patent [19]

Pelin

[11] 3,991,563

[45] Nov. 16, 1976

[54] HYDROELECTRIC POWER PLANT

[76] Inventor: Charles Pelin, R.R. 1, Box 1460, Eastsound, Wash. 98245

[22] Filed: Mar. 12, 1975

[21] Appl. No.: 557,617

[52] U.S. Cl. ................................. 60/325; 60/398; 290/1 R; 290/4 R
[51] Int. Cl.² ........................................ F16D 33/00
[58] Field of Search ............ 60/325, 327, 398, 495, 60/496; 290/1 R, 1 A, 4 R

[56] References Cited
UNITED STATES PATENTS

| 271,040 | 1/1883 | Cook | 60/496 |
|---|---|---|---|
| 1,751,667 | 3/1930 | Taylor | 60/398 |
| 2,105,624 | 1/1938 | Orlove | 60/327 |

Primary Examiner—Edgar W. Geoghegan
Attorney, Agent, or Firm—Christopher Duffy

[57] ABSTRACT

The housing of the power plant defines a chamber at a level below the surface of a surrounding body of water; and also a series of penstocks which open into the water at points between the level of the chamber and the surface of the water, and which discharge into the chamber. The hydroelectric power generating means in the plant include turbines in the penstocks, and means for discharging the tailwater from the respective turbines including nipples on the housing which communicate with the chamber and open into the body of water at levels below that of the chamber. The nipples have open ended thimble-like vessels telescopically engaged thereon, to be extended and retracted in relation to the respective nipples axially thereof; and the nipples and vessels have float operated check valves therein adjacent the chamber and the end openings of the vessels, respectively, each of which is adapted to permit flow in the direction relatively from the chamber toward the body of water when open, and to prevent flow in the opposite direction when closed. Also, there are additional valve means in the tailwater discharge means which are adapted to equalize the pressure in the vessels with that in the body of water when the respective check valves in the vessels are closed. Drive means operate to extend and retract the respective vessels, and there are control means connected to the drive means, which are operative through the same (1) to extend and retract the respective vessles in staggered sequence about the circumference of the housing, with each vessel undergoing an at-rest period between the respective extraction and extension stages thereof when the vessel is fully retracted, and (2) to control the rate of extension and retraction of the respective vessels, and the length of their respective rest periods, as a function of the water level in the chamber. Each of the vessels is adapted in buoyancy to hover in equilibrium in the body of water when at rest, and the number of nipples and vessels is adapted in relation to the number of penstocks and turbines so that the vessels collectively discharge the tailwater from the turbines at a rate adapted to maintain the water level in the chamber between predetermined limits.

12 Claims, 11 Drawing Figures

HYDRO ELECTRIC POWER PLANT

SUMMARY OF THE INVENTION

This invention relates to a hydroelectric power generating plant, and in particular to one employing a series of turbines in penstocks, and a novel system for dispersing the tailwater discharge from the turbines by gravity.

According to the invention, the power plant comprises a columnar housing erected in a body of water and defining a chamber therewithin at a level below the surface of the body of water and a series of penstocks which open into the body of water at points about the perimeter of the housing between said level and the surface of the body of water and which discharge into the chamber. It also comprises hydroelectric power generating means including turbines in the penstocks and means for discharging the tailwater from the respective turbines including nipples on the housing which communicate with the chamber and open into the body of water at levels below that of the chamber. The nipples have open ended thimble-like vessels telescopically engaged thereon, to be extended and retracted in relation to the respective nipples axially thereof; and the nipples and vessels have float operated check valves therein adjacent the chamber and the end openings of the vessels, respectively, each of which valves is adapted to permit flow in the direction relatively from the chamber toward the body of water when open, and to prevent flow in the opposite direction when closed. Also, there are additional valve means in the tailwater discharge means which are adapted to equalize the pressure in the vessels with that in the body of water when the respective check valves in the vessels are closed. Drive means extend and retract the respective vessels, and there are control means connected to the drive means, which are operative through the same (1) to extend and retract the respective vessels in staggered sequence about the circumference of the housing, with each vessel undergoing an at-rest period between the respective retraction and extension stages thereof when the vessel is fully retracted, and (2) to control the rate of extension and retraction of the respective vessels, and the length of their respective rest periods, as a function of the water level in the chamber. Each of the vessels is adapted in buoyancy to hover in equilibrium in the body of water when at rest, and the number of nipples and vessels is adapted in relation to the number of penstocks and turbines so that the vessels collectively discharge the tailwater from the turbines at a rate adapted to maintain the water level in the chamber between predetermined limits.

The control means may include a pair of water level sensors adjacent the respective water level limits in the chamber. The drive means may include a drive screw for each vessel on a parallel to the axis of the corresponding nipple, and means operatively interconnecting the vessel and the screw to convert the rotation of the screw into translatory motion on the part of the vessel.

Each vessel may comprise a plurality of relatively telescopically engaged tubular members, the innermost of which is telescopically engaged on the corresponding nipple. In such a case the equalizing valve means may be disposed on the nipples and the outermost tubular members.

There may be a throttle valve in each penstock to control the rate of flow therethrough. The power plant may further comprise a pump interconnected between the chamber and each vessel to pressurize the water in the vessel when the check valve in the vessel is closed. Also, the power plant may further comprise means for latching the check valve in each vessel in the closed condition thereof, and means operative to deactivate the latch means when the vessel assumes the fully extended condition thereof.

The power plant may further comprise a propeller means on the open end of each vessel, and means operatively interconnected between the propeller means and the drive means to rotate the propeller means when the vessel is undergoing extension and thus increase the forward thrust of the vessel in the direction of its extension. Likewise, the power plant may further comprise an impeller means on each nipple, and means operatively interconnected between the impeller means and the drive means to rotate the impeller means when the corresponding vessel undergoes extension and thus increase the forward thrust of the tailwater on the vessel in the direction of its extension.

The nipples may be arranged on horizontal axes; and they may be arranged on vertical axes.

BRIEF DESCRIPTION OF THE DRAWINGS

These features will be better understood by reference to the accompanying drawings which illustrate a presently preferred embodiment of the invention.

In the drawings.

DESCRIPTION OF THE PREFERRED EMBODIMENT

Figure 1:
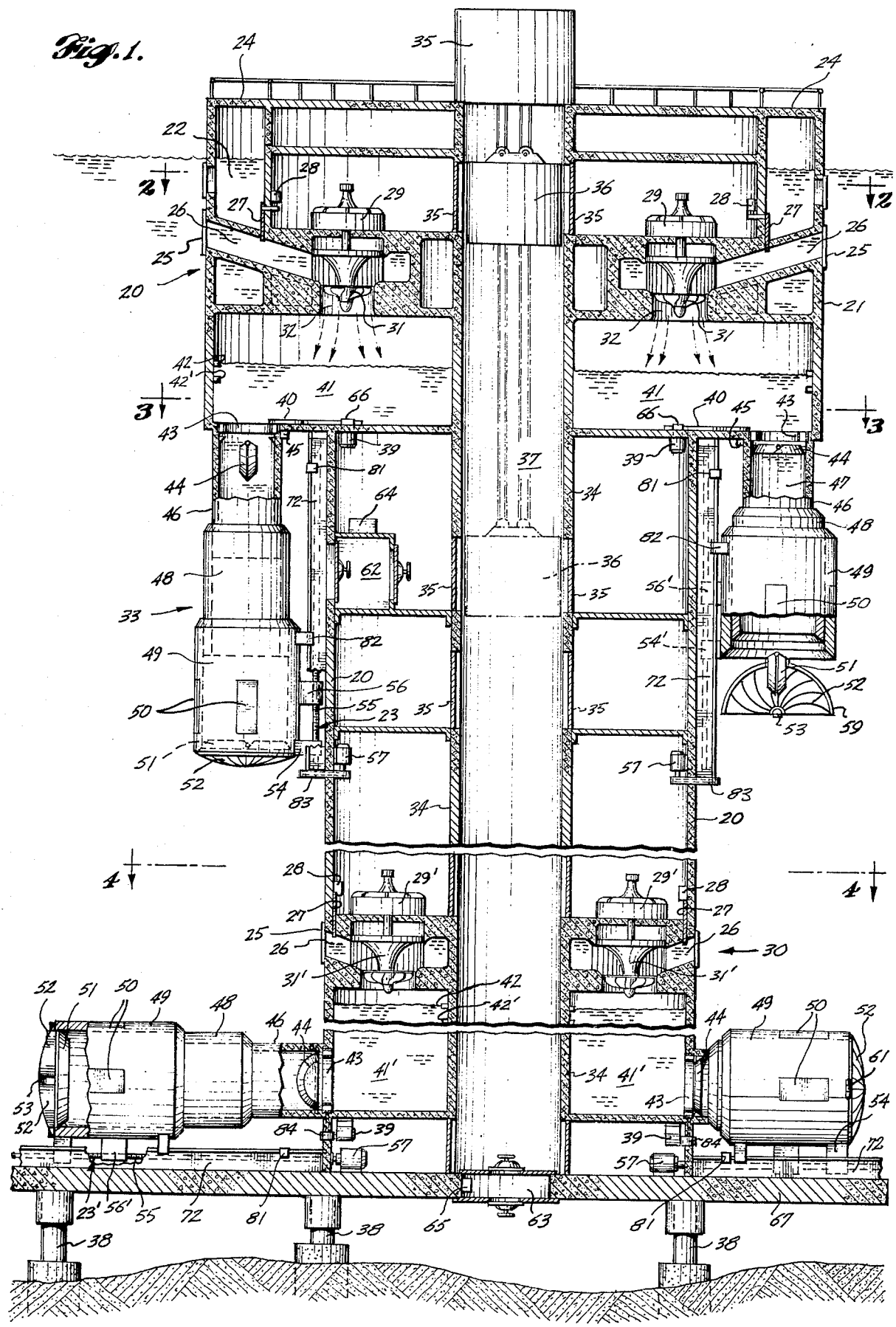
FIG. 1 is a part cross-sectional view through the power plant, vertically thereof.

Referring to the drawings, it will be seen that the power plant comprises a columnar housing 20 having a diametrically enlarged top portion 21. The housing is erected in a body of water on a platform 67 which rests in turn on a plurality of adjustable hydraulic pods 38. Interiorly, the housing has an elevator shaft 37 at the center thereof, and defines upper and lower annular chambers 41 and 41' thereabout, each of which is disposed at a level below the surface of the body of water. The housing also defines a series of penstocks 26 for each chamber, and each series of penstocks opens into the body of water at points 25 spaced about the perimeter of the housing between the level of the respective chamber and the surface of the body of water. The respective sets of penstocks are accompanied by hydroelectric power generating means 29 or 29' that include turbines 31 or 31' which are disposed in the penstocks and discharge their tailwater into the respective chamber through a corresponding series of vertical draft tubes 32. The tailwater is discharged from the chamber in turn by a series of nipples 46 on the housing, which communicate with the chamber and open into the body of water at a level below that of the chamber. The nipples have open-ended thimble-like vessels 33 telescopically engaged thereon, which are adapted to be extended and retracted in relation to the respective nipples, axially thereof, to disperse the tailwater as it accumulates in the chamber.

The upper chamber 41 and accompanying penstocks, turbines, nipples and vessels constitute one power house; and the lower chamber 41' and accompanying penstocks, turbines, nipples and vessels constitute a second power house 30. However, the nipples and vessels of the upper power house are arranged on vertical axes, whereas the nipples and vessels of the lower power house are arranged on horizontal axes.

Figure 9:
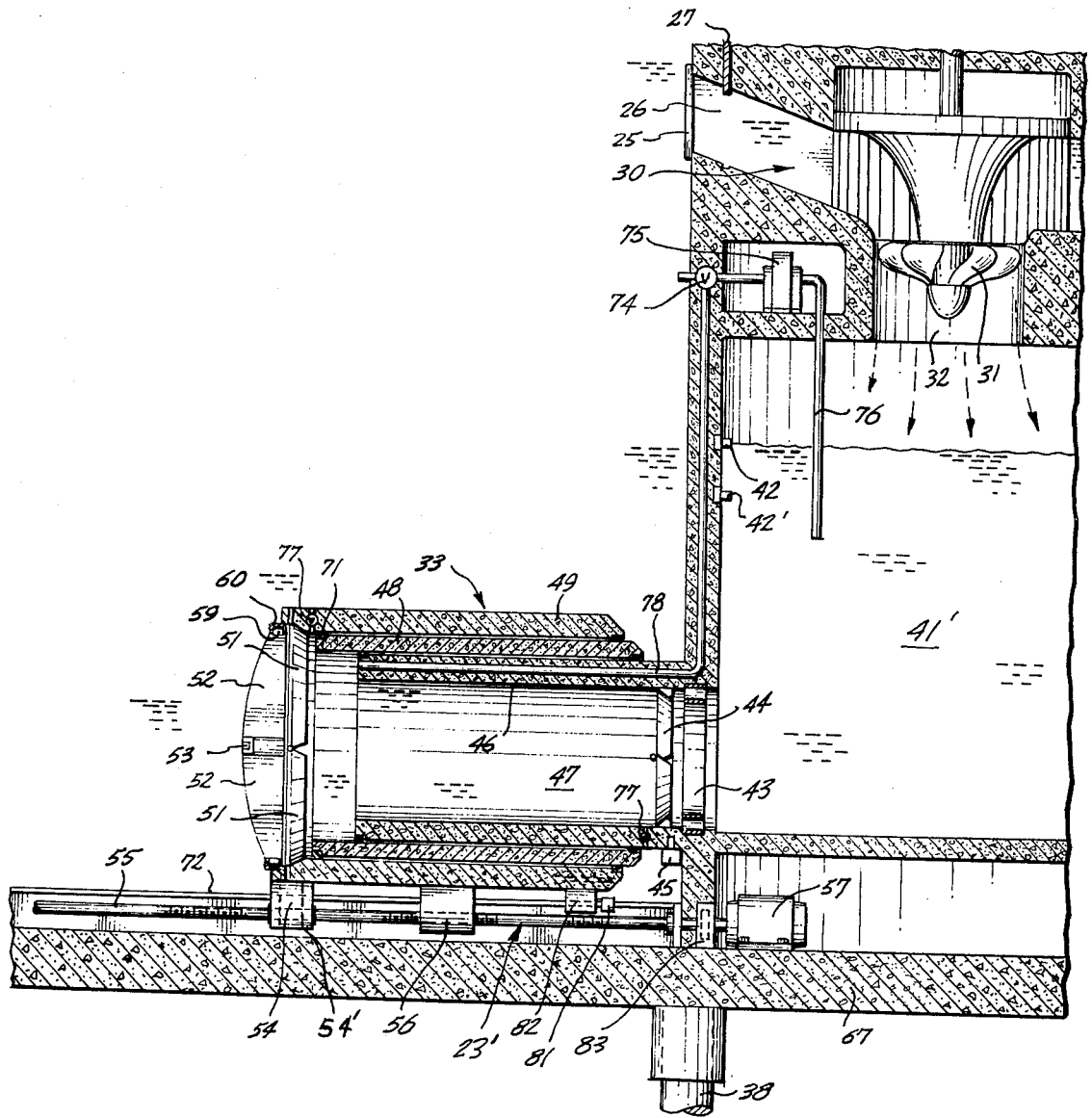
FIG. 9 is a somehwat enlarged part cross-sectional view of a horizontally oriented tailwater discharge unit in the power plant of FIG. 1, when the vessel of the respective unit is in the retracted condition thereof.
Figure 10:
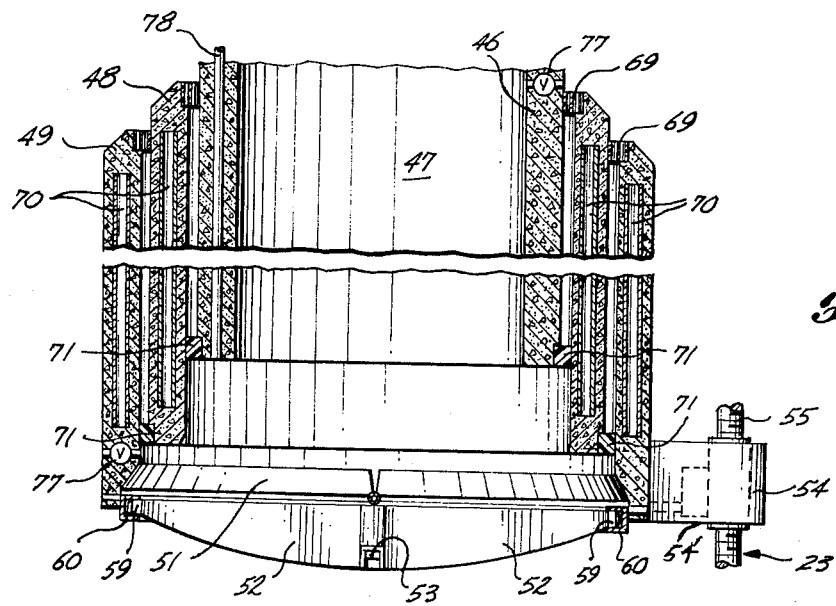
FIG. 10 is an enlarged part cross-sectional view of the vessel in FIG. 5 after rotating to a different cross-sectional plane.
Figure 11:
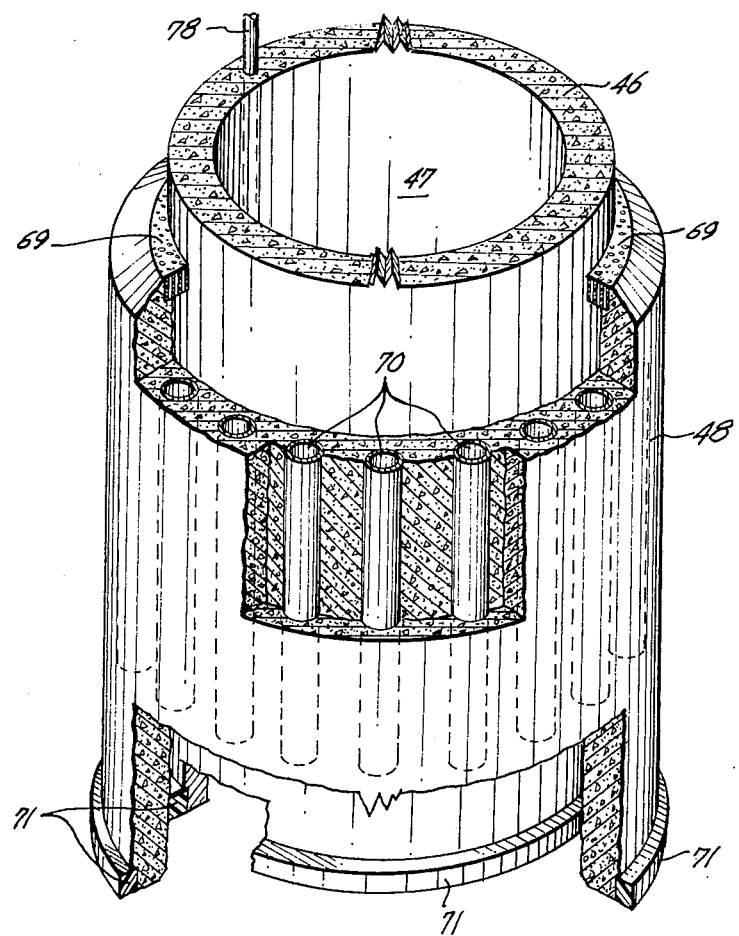
FIG. 11 is a part cutaway, part perspective view of the vessel in FIGS. 5-8 and 10.

Each vessel 33 comprises a plurality of relatively telescopically engaged tubular members 48 and 49, the innermost of which, 48, is telescopically engaged on the corresponding nipple 46. The nipples and vessels have float operated check valves 44 and 51 therein, adjacent the chamber and the end openings of the vessels, respectively, and each of the check valves is adapted to permit flow in the direction relatively from the chamber toward the body of water when open, and to prevent flow in the opposite direction when closed. There are also additional valve means 77 (FIGS. 9 and 10) on the nipples and outermost tubular members 49, which are adapted to equalize the pressure in the respective vessels with that in the body of water when the respective check valves 51 in the vessels are closed.

Figure 8:
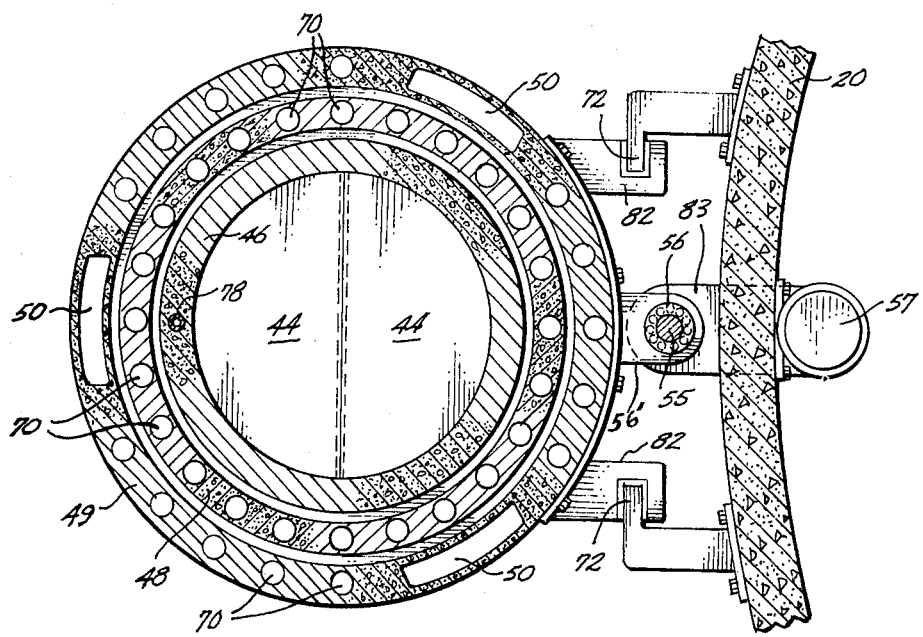
FIG. 8 is a part cross-sectional view along the line 8—8 of FIG. 5.
Figure 3:
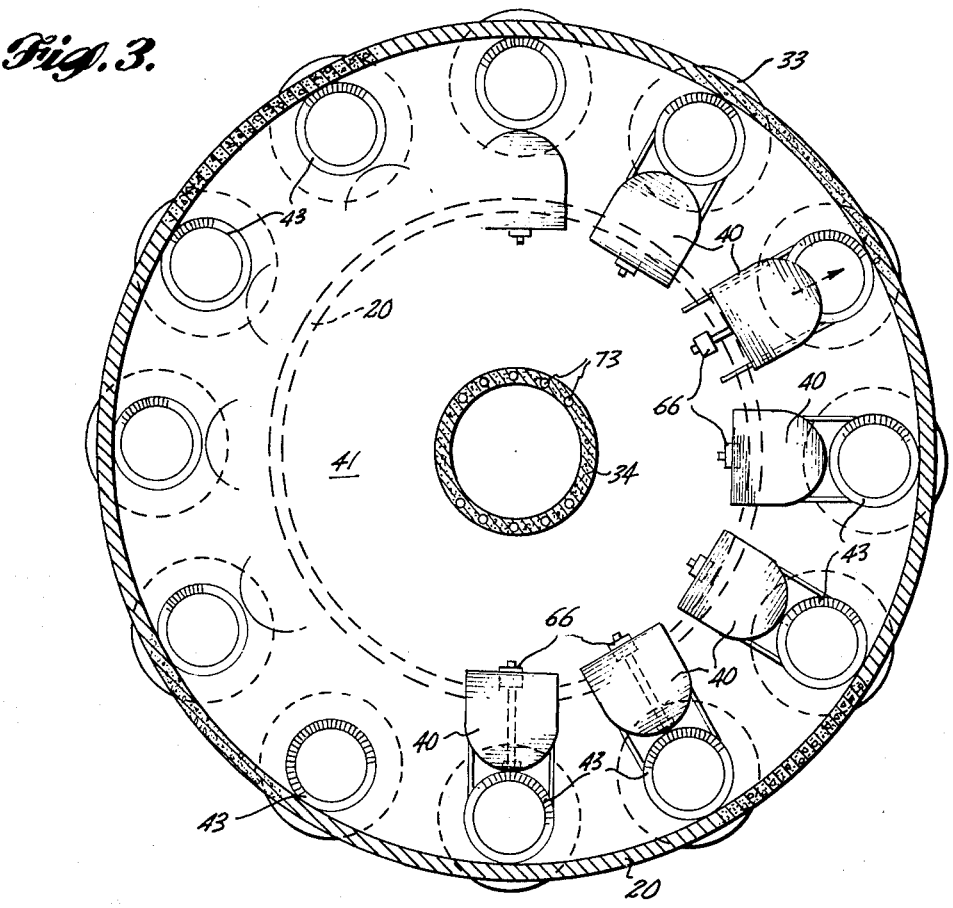
FIG. 3 is a similar view along the line 3—3 of FIG. 1.

The vessels are extended and retracted by drive means 23 and 23' in the respective power houses. Each drive means includes a drive screw 55 on a parallel to the axis of the corresponding nipple. The screw is driven by a motor 57, through a variable gear box 83, and is interconnected with the vessel through an arm 56' (FIG. 8) on the outer tubular member 49. The screw is engaged in a bushing 56 on the arm, and the bushing is threaded to convert the rotation of the screw into translatory motion on the part of the member 49 and thus the vessel 33. The motion is guided by a pair of interdigitating rails 72 and arms 82, on the housing 20 or platform 67, and the respective outer tubular member 49. Stops 81 limit the motion of the member.

Each chamber has control means associated therewith, including a pair of water level sensors 42 and 42' and a reversing switch 45, which are connected to the respective drive means so as to extend and retract the respective set of vessels in staggered sequence to one another about the circumference of the housing, with each vessel undergoing an at-rest period between the respective retraction and extension stages thereof when the vessel is fully retracted. The control means also control the rate of extension and retraction of the vessels, and the length of their respective rest periods, as a function of the water level in the respective chamber. In addition, each penstock has a throttle valve 27 therein to control the rate of flow therethrough, and the number of nipples and vessels in each power house is adapted in relation to the number of penstocks and turbines in that power house, so that the vessels collectively discharge the tailwater from the turbines at a rate adapted to maintain the water level in the chamber between limits corresponding to the levels of the sensors 42 and 42'.

Each vessel is also constructed so that the vessel is adapted in buoyancy to hover in equilibrium in the body of water when at rest. FIGS. 5, 8, 10 and 11 illustrate the preferred means for achieving this. As seen, each vessel has a series of hermetically sealed tubes 70 therein, the volume of which is in such proportion to the weight of the concrete or other material forming the vessel, that the displacement volume of the vessel equals the same volume of water in weight. The tubular member 48 is sealed and has a fixed buoyancy factor, whereas member 49 is equipped with trim tanks 50 (FIGS. 5 and 8) having intakes and outlets 79 (FIG. 5) by which the weight of the vessel can be adjusted from time to time as required. Electrical circuitry (not shown) is built into the walls of the vessels, and is closed when the vessel is retracted and at rest, so that the trim tank adjustment can be accomplished from a central control room (not shown).

Initially, when the power plant is put into operation, all of the vessels are fully retracted over the nipples and filled with water. The chambers, however, are empty. When the valves 27 are opened and water is released into the penstocks, the tailwater from the turbines discharges into the respective chambers and accumulates to the high level control sensor 42 in each chamber. At this point, the control means activates the respective drive means 23 and 23', which in turn drives the respective sets of vessels in staggered sequence to one another as mentioned. As each vessel undergoes extension, the valve 51 remains closed and the valve 44 opens and allows the water in the respective chamber to accumulate in the vessel, thus maintaining the necessary equilibrium condition for that vessel. Ultimately, when the vessel is fully extended (FIG. 6), the valve 44 floats into its closure position and closes the opening in the nipple 46. As it closes, moreover, the valve 44 activates the switch 45 to reverse the drive means for the vessel. The vessel then undergoes retraction, and as it does, the valve 51 opens to convert the vessel into a bottomless tube. Subsequently, when the vessel is fully retracted over the nipple, the valve 51 floats into its closure position and closes the open end of the vessel, thus reforming the vessel as a closed tube.

Should the water level in a chamber require a change in the sequencing of the vessels, the control means accomplishes this for example, by shortening or lengthening the rest period of the vessels, thus changing the rate at which the chamber is drained. In any event, each chamber is continuously drained and hydroelectric power is generated at 29 or 29' as new water is added to each chamber through the turbines thereabove.

The vessels and nipples are equipped with propeller means 52, 53, 59 and impeller means 43, respectively, for increasing the forward thrust of the respective vessels in the direction of their extension. Referring first to FIGS. 4, 5, 6, 9 and 10, it will be seen that the valves 51 each comprise a pair of semi-circular flaps which are diametrically hinged to the end opening of the tubular member 49 in the respective vessel, and adapted to seat across the opening when water tends to flow in the direction relatively toward the chamber, but to swing open when water tends to flow relatively away from the same. In addition, the tubular member 49 has an annular race 60 about the leading edge thereof and there is a propeller means 52, 53, 59 rotatably mounted within the race. The propeller means includes a central hub 53 and a series of variable pitch propeller blades or vanes 52 thereabout, which in turn have a rim gear 59 at the circumferential periphery thereof. The drive screw 55 of the vessel is interconnected with the propeller means through a gear box 54 in an arm 54' on the outer tubular member 49, and when the valve 51 is closed, the propeller means is caused to rotate within the race to increase the forward thrust of the vessel. However, the propeller means is divided in half along a line perpendicular to the hinge of the valve 51, and the halves of the propeller means are hinged to the race at 61 to enable the propeller means to swing open in the manner of FIG. 6 in conjunction with the valve 51. The propeller means are also float-operated to enable them to close with the valve, and there is a latch in the hub 53 which secures the halves of the propeller means to one another when the valve and propeller means close. The latch is released by a cam 58 on the housing or platform, when the vessel is fully extended, to enable the valve and propeller means to open.

Figure 7:
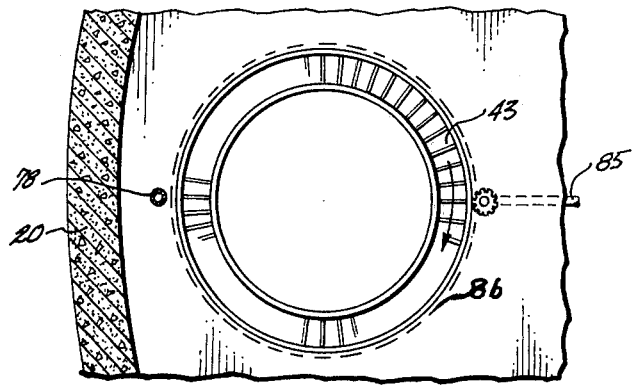
FIG. 7 is a fragmentary part cross-sectional view of the unit along the line 7—7 of FIG. 5.
Figure 4:
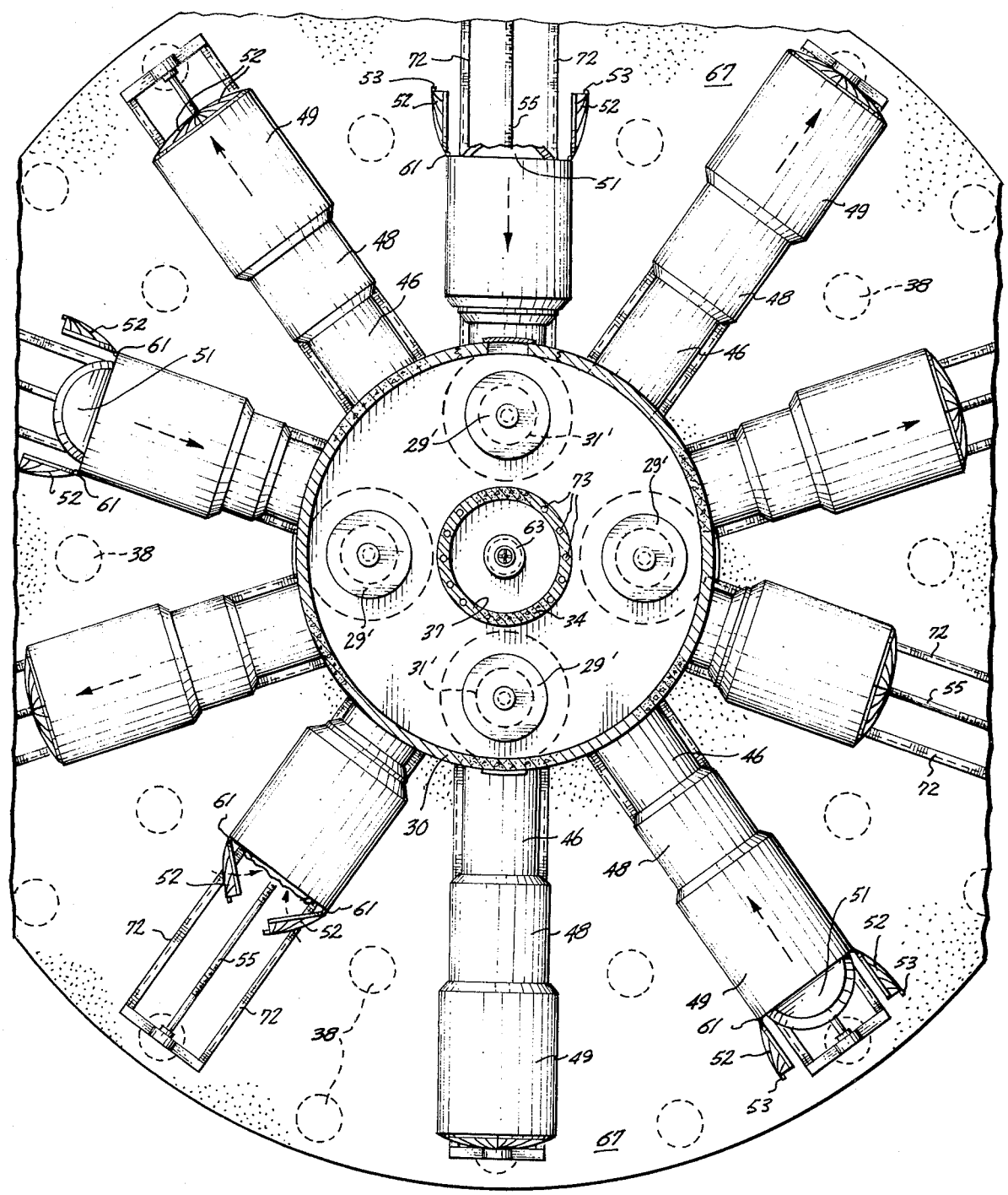
FIG. 4 is another such view along the line 4—4 of FIG. 1.
Figure 5:
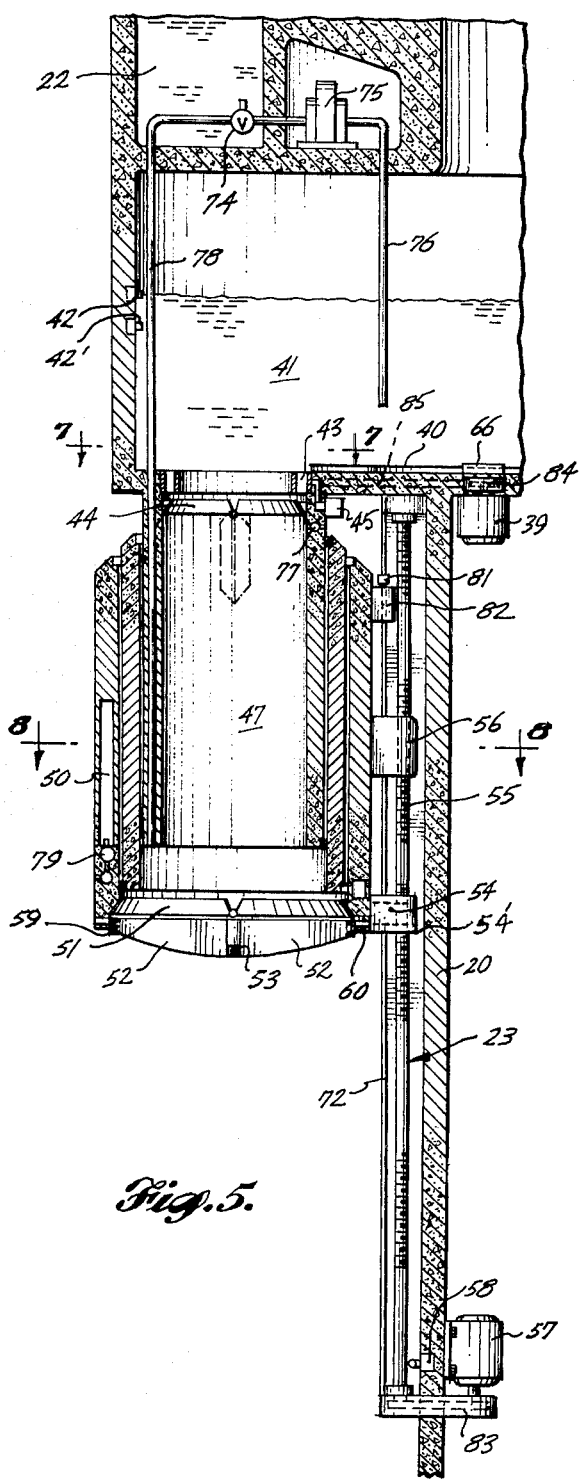
FIG. 5 is a somewhat enlarged part cross-sectional view of a vertically oriented tailwater discharge unit in the power plant, when the respective vessel of the unit is in the retracted condition thereof.
Figure 6:
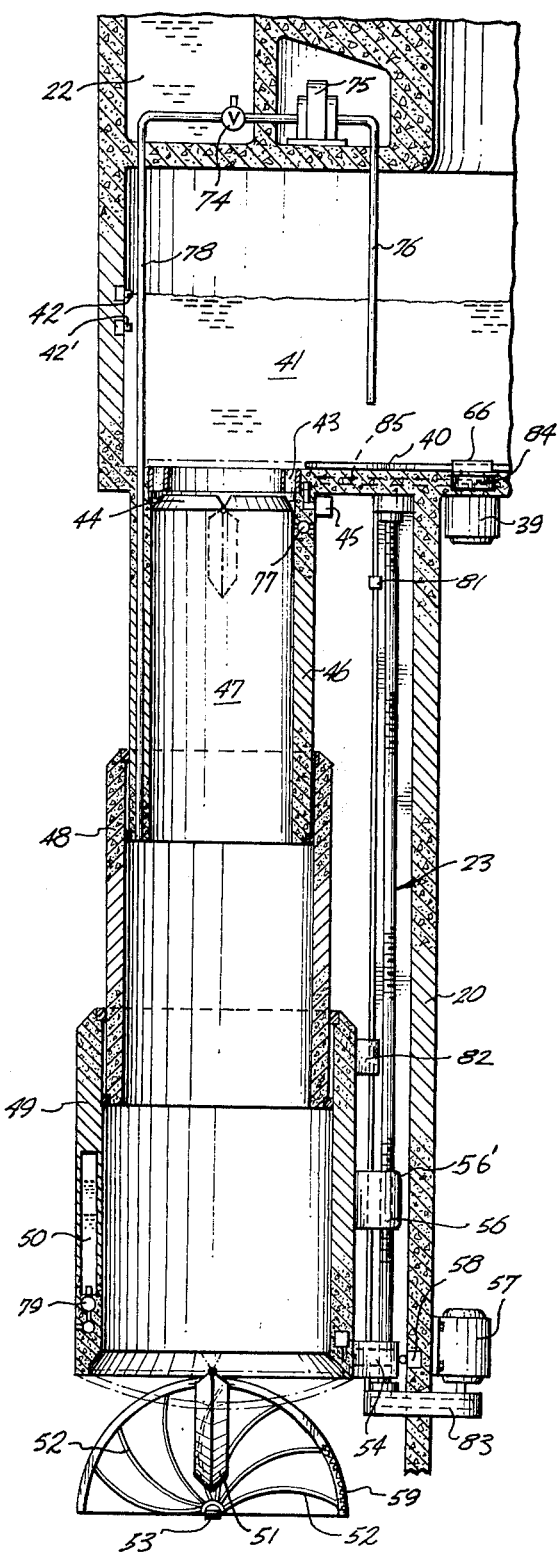
FIG. 6 is a similar view of the unit when the respective vessel is in the extended condition thereof.

Referring next to FIGS. 5–7, it will be seen that the valve 44 is similar to the valve 51 and there is a race 86 in the opening of the nipple, relatively inside of the valve 44. An annular impeller means 43 is seated in the race, and is driven by a motor 39, acting through a gear box 84 and drive shaft 85, to increase the forward thrust of the corresponding vessel when the valve 44 is open.

The telescopic members 48 and 49 in each vessel 33 are separated by spacer rings 69 and 71 (FIGS. 10 and 11), the relatively forward of which, 71, is water tight to seal the joint between members, and the relatively rearward of which, 69, is perforated to allow water to enter the joint.

A high pressure pump 75 (FIGS. 5, 6 and 9) is interconnected between each chamber and the interiors of its associated vessels 33, to make it possible to pressurize the respective vessels when they are at rest, if desired. The pump is interconnected with the chamber through a pipe connection 76 on the suction side thereof, and interconnected with the interior of each vessel through a pipe connection 78 on the discharge side thereof. The latter connection extends through the wall of the corresponding nipple 46, axially thereof, and is equipped with a check valve 74. The valves 77 are also adapted as non-return valves, so that the vessels can be pressurized to a pressure above that existing externally of the vessels, if desired.

The opening in each nipple is also controlled by a closure member 40 which is driven by a motor 66 that is actuatable from the control room of the power plant so that each tailwater discharge means can be sealed off for inspection or repair if desired.

Figure 2:
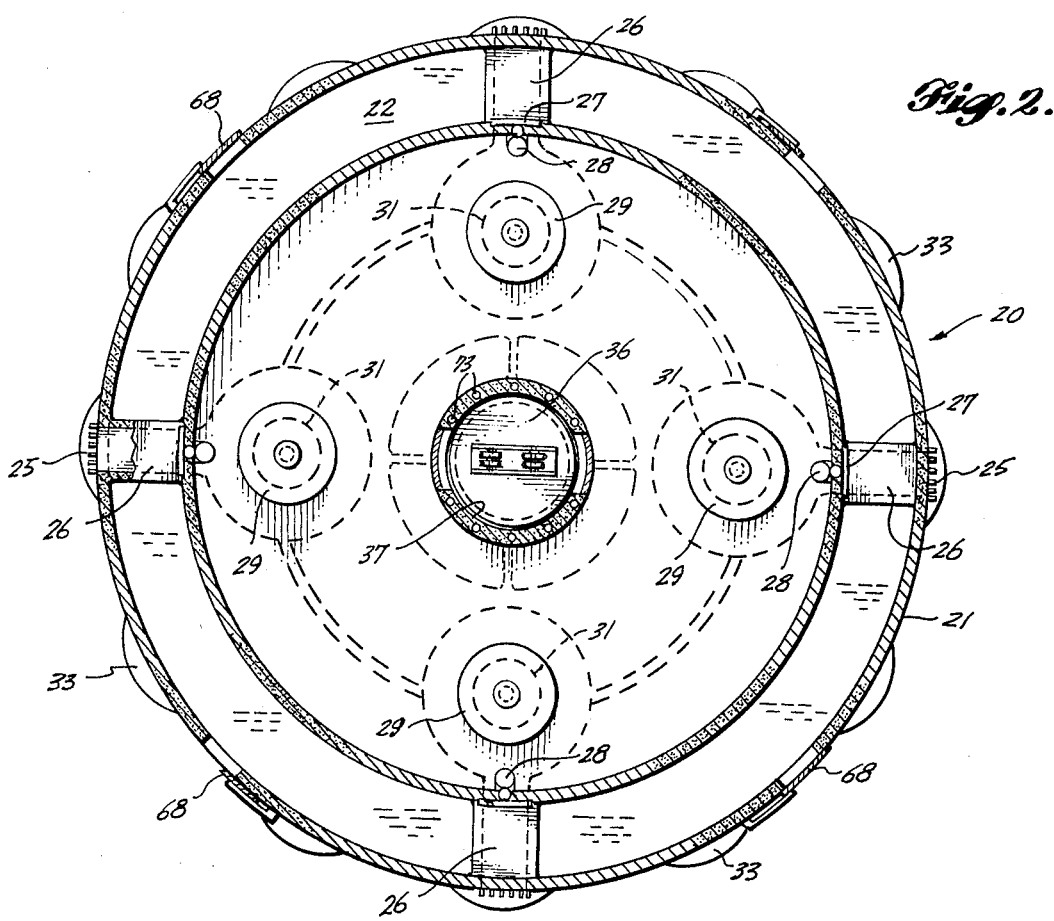
FIG. 2 is a cross-sectional view of the power plant along the line 2—2 of FIG. 1.

The relatively enlarged top portion 21 of the housing has a moat 22 about the perimeter thereof, which is penetrated by the penstocks 26 of the upper power house. The moat has gated openings 68 (FIG. 2) therein, so that it can operate as a shelter for tenders and other craft. The penstock openings 25 are protected by trash grids and are spaced equidistantly apart about the perimeter of the power house. The valves 27 in the penstocks are hydraulically operated at 28.

The lower power house has a similar number of penstocks which are likewise spaced equidistantly apart about the perimeter of the same.

The top surface 24 of the housing forms a loading deck and a temporary berth for cargo vessels. The deck has access to an elevator 36 in the elevator shaft 37, through an entry point 35 therein. The elevator shaft also has other entry points 35 in the wall 34 thereof. The wall also has channels 73 extending therewithin for remote control circuitry, etc., (not shown). At the base of the elevator shaft is an access chamber 63 for in and out movement of divers; and a decompression chamber is provided at 62 with a life support system 64, for use by the divers.

I claim:

1. A hydroelectric power plant comprising a columnar housing erected in a body of water and defining a chamber therewithin at a level below the surface of the body of water and a series of penstocks which open into the body of water at points about the perimeter of the housing between said level and the surface of the body of water and which discharge into said chamber; hydroelectric power generating means including turbines in the penstocks and means for discharging the tailwater from the respective turbines including nipples on the housing which communicate with the chamber and open into the body of water at levels below that of the chamber, and which have open ended thimble-like vessels telescopically engaged thereon, to be extended and retracted in relation to the respective nipples axially thereof, said nipples and vessels having float operated check valves therein adjacent the chamber and the end openings of the vessels, respectively, each of which valves is adapted to permit flow in the direction relatively from the chamber toward the body of water when open, and to prevent flow in the opposite direction when closed, and there being additional valve means in the tailwater discharge means which are adapted to equalize the pressure in the vessels with that in the body of water when the respective check valves in the vessels are closed, drive means for extending and retracting the respective vessels, and control means which are connected to the drive means and operative through the same (1) to extend and retract the respective vessels in staggered sequence about the circumference of the housing, with each vessel undergoing an at-rest period between the respective retraction and extension stages thereof when the vessel is fully retracted, and (2) to control the rate of extension and retraction of the respective vessels, and the length of their respective rest periods, as a function of the water level in the chamber, the vessels each being adapted in buoyancy to hover in equilibrium in the body of water when at rest, and the number of nipples and vessels being adapted in relation to the number of penstocks and turbines so that the vessels collectively discharge the tailwater from the turbines at a rate adapted to maintain the water level in the chamber between predetermined limits.

2. The hydroelectric power plant according to claim 1 wherein the control means includes a pair of water level sensors adjacent the respective water level limits in the chamber.

3. The hydroelectric power plant according to claim 13 wherein each vessel comprises a plurality of relatively telescopically engaged tubular members, the innermost of which is telescopically engaged on the corresponding nipple.

4. The hydroelectric power plant according to claim 3 wherein the equalizing valve means are disposed on the nipples and the outermost tubular members.

5. The hydroelectric power plant according to claim 1 wherein the drive means includes a drive screw for each vessel on a parallel to the axis of the corresponding nipple, and means operatively interconnecting the vessel and the screw to convert the rotation of the screw into translatory motion on the part of the vessel.

6. The hydroelectric power plant according to claim 1 wherein there is a throttle valve in each penstock to control the rate of flow therethrough.

7. The hydroelectric power plant according to claim 1 further comprising a pump interconnected between the chamber and each vessel to pressurize the water in the vessel when the check valve in the vessel is closed.

8. The hydroelectric power plant according to claim 1 further comprising means for latching the check valve in each vessel in closed condition thereof, and means operative to deactivate the latch means when the vessel assumes the fully extended condition thereof.

9. The hydroelectric power plant according to claim 1 further comprising a propeller means on the open end of each vessel, and means operatively interconnected between the propeller means and the drive means to rotate the propeller means when the vessel is undergoing extension and thus increase the forward thrust of the vessel in the direction of its extension.

10. The hydroelectric power plant according to claim 1 further comprising an impeller means on each nipple, and means operatively interconnected between the impeller means and the drive means to rotate the impeller means when the corresponding vessel undergoes extension and thus increase the forward thrust of the tailwater on the vessel in the direction of its extension.

11. The hydroelectric power plant according to claim 1 wherein the nipples are arranged on horizontal axes.

12. The hydroelectric power plant according to claim 1 wherein the nipples are arranged on vertical axes.

* * * * *

UNITED STATES PATENT OFFICE
CERTIFICATE OF CORRECTION

Patent No. 3,991,563　　　　　　　　Dated November 16, 1976

Inventor(s) CHARLES PELIN

It is certified that error appears in the above-identified patent and that said Letters Patent are hereby corrected as shown below:

In the Claims, and specifically Claim 3, line 2, delete "13" and insert -- 1 --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*